Feb. 23, 1954   J. M. SHEADEL ET AL   2,670,398
LIGHTNING ARRESTER
Filed April 17, 1950   2 Sheets-Sheet 1

INVENTOR.
JOHN J. TAYLOR
BY JOHN M. SHEADEL

ATTORNEY

Feb. 23, 1954   J. M. SHEADEL ET AL   2,670,398
LIGHTNING ARRESTER
Filed April 17, 1950                    2 Sheets-Sheet 2
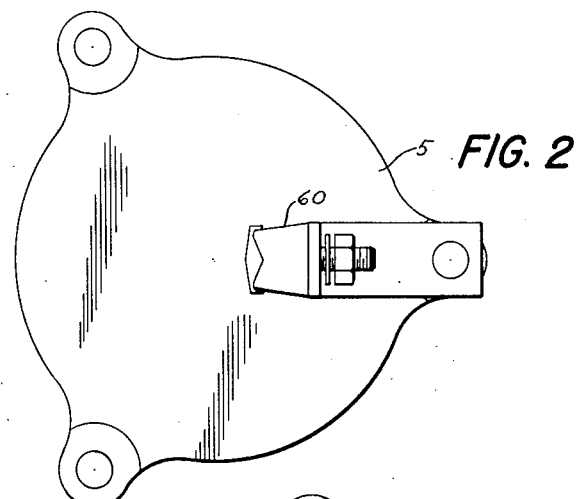
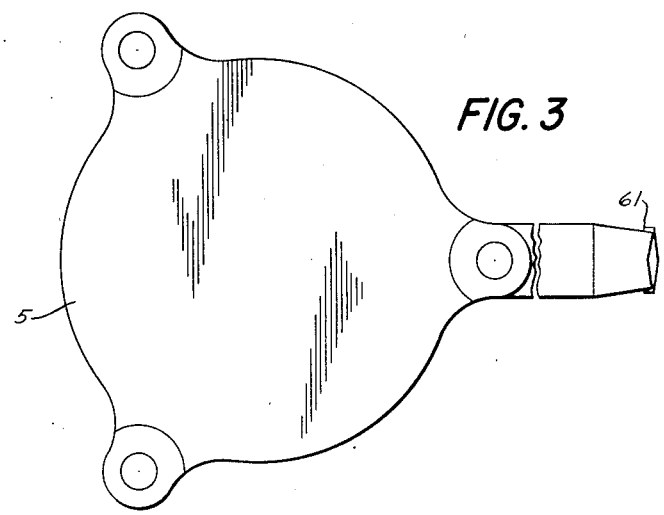
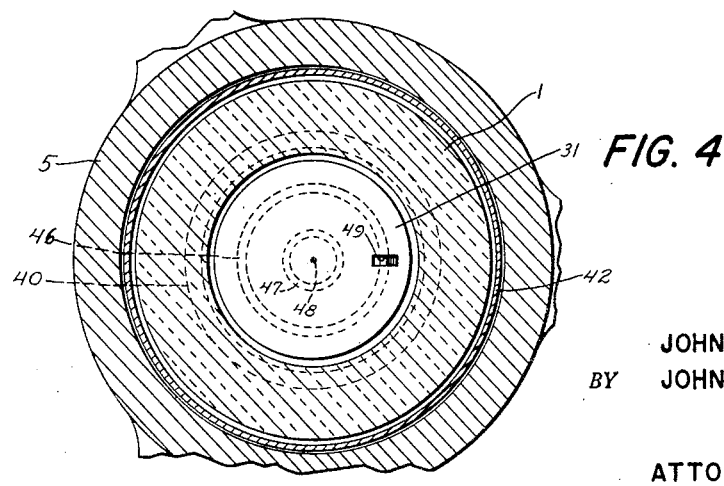
INVENTOR.
JOHN J. TAYLOR
BY JOHN M. SHEADEL
Gordon C Mack
ATTORNEY Patented Feb. 23, 1954

2,670,398

UNITED STATES PATENT OFFICE 2,670,398

LIGHTNING ARRESTER

John M. Sheadel, Barberton, and John J. Taylor, Wadsworth, Ohio, assignors to The Ohio Brass Company, Mansfield, Ohio, a corporation of New Jersey Application April 17, 1950, Serial No. 156,244

3 Claims. (Cl. 174—17.08)

This invention relates to an improved lightning arrester of the type which embodies a generally cylindrical housing. It relates more particularly to the means for closing the ends of the housing.

The lightning arrester may be used generally to protect high voltage equipment, and ordinarily will not be used as a distribution arrester. Any type of lightning-arrester elements may be used within the housing. They may be used in any combination and arranged in any order.

The invention relates more particularly to the end closure of the arrester. Closures identical in construction, or substantially so, may be used at both ends of the housing. Alternatively, one end of the housing may be closed in the manner herein described and the other end may be closed in an entirely different manner. The end closure includes a metal sealing cap which is fastened onto the housing. A circular gasket compressed between the sealing cap and the end of the housing forms a seal so that the interior of the housing and the space at each end of the housing under the cap and enclosed by this gasket may be filled with a dry gas. The sealing cap is enclosed within an end fitting of a suitable metal, and there is a spring between the end fitting and the sealing cap which keeps the gasket in pressure contact with both the sealing cap and the end of the housing. The pressure applied to the gasket by the spring is maintained throughout the life of the gasket so that as the gasket relaxes on aging there is still sufficient pressure on it to maintain the seal. The spring is preferably an annular spring plate which is fulcrumed on the edge of a circular depression in the end fitting larger in diameter than the gasket. Other springs, such as a coil spring, etc. might be used. The end fitting is joined to the housing by cement in a suitable manner and a barrier is provided to prevent the cement from filling the recess between the end fitting and the sealing cap, and interfering with the operation of the spring. The sealing cap at one end of the housing is perforated so that the air in the housing can be replaced by any suitable gas.

The invention will be further described in connection with the accompanying drawings, which illustrate an arrester both ends of which are closed by the closure means of this invention.

Fig. 2 is a view of the top of the arrester;

Fig. 3 is a view of the bottom of the arrester; and

Fig. 4 is a horizontal section through the arrester on the line 4—4 of Fig. 1.

Figure 1:
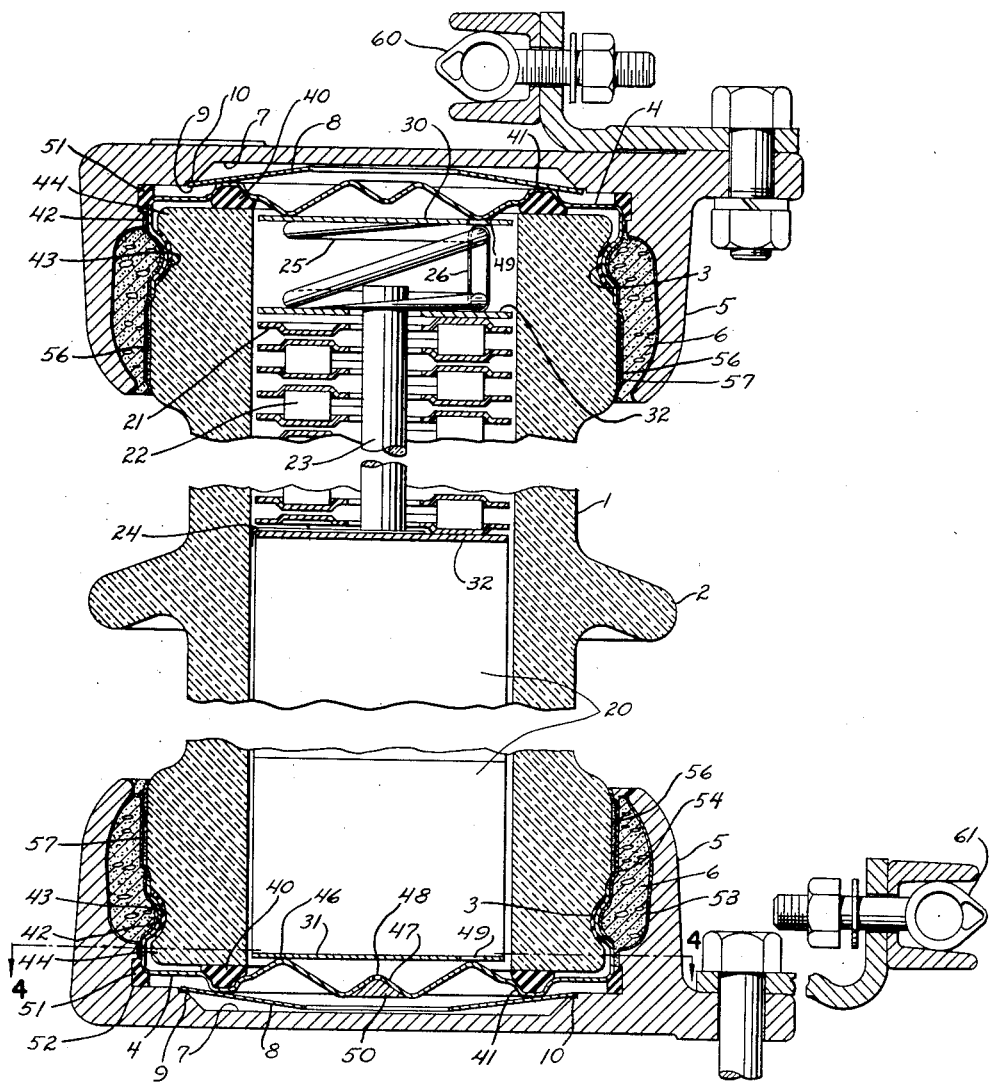
Fig. 1 is a vertical section through the lightning arrester.

The arrester includes the porcelain housing 1 which is provided with one or more petticoats 2. Near each end of the housing is a groove 3 which encircles the housing. Each end of the housing is closed by a sealing cap 4 of copper or the like which is fastened to the housing in any suitable manner. Enclosing this cap is the metal end fitting 5 of malleable iron, etc. which is united to the housing by a suitable cement 6. In the circular indentation 7 in the end of the end fitting is the annular spring plate 8 which is fulcrumed on the edge 9 of the ledge 10 at the edge of the indentation.

The lightning-arresting elements within the housing are not a part of the invention. They may, for example, include several valve blocks 20, gap electrodes 21, grading resistors 22, the central porcelain rod 23, diaphragm 24, a coil spring 25 and short-circuiting strap 26. Metal contact discs 30 and 31 are provided at the ends of the opening in the housing. Other contact discs 32 are provided between the valve blocks and the gap chamber, and between the gap chamber and the coil spring. The coil spring maintains these elements in pressure contact and exerts pressure on the contact discs 30 and 31 at the ends of the opening.

After the air in a lightning arrester has been removed it is replaced with dry nitrogen, carbon dioxide or other oxygen-free gas. To retain this gas, a rubber sealing gasket 40 is provided in the circular groove 41 in each sealing cap. The side wall 42 of each sealing cap is rolled, or spun, or otherwise pressed into the groove 3 to hold the cap in place over the end of the housing. The groove 3 is lined with a rubber band 43 before pressing the side wall of the sealing cap against it. This rubber band forms a seal between the sealing cap and the housing and by bending the side wall of the sealing cap into the groove over the projection 44 of the housing the cap is permanently fastened onto the end of the housing.

From the groove 41 each sealing cap is bent inwardly and forms annular contact at 46 with the contact disc at its end of the housing. From here the sealing cap is bent outwardly except that there is a depression 47 at the center of the sealing cap. In the depression 47 at one end of the lightning arrester is a perforation 48 through which the housing is first evacuated and then filled with inert gas. A slot 49 may be provided in the contact discs to facilitate air removal and replacement by a desirable gas.

The gas within the housing is at substantially atmospheric pressure. As soon as the air in the housing has been replaced, the perforation is closed by solder which forms the metal plug 50. The substantial absence of oxygen prevents the formation of any considerable amount of ozone. This retards deterioration of the gaskets 40 if made of rubber.

In assembling the lightning arrester a circular gasket 40 is placed in the groove 41 in one of the sealing caps. A rubber band 43 is placed in the groove 3 at each end of the housing. The lightning arrester elements are arranged in their proper order on the sealing cap. Then the housing is lowered over these elements into position in the sealing cap. The other gasket and sealing cap are positioned over the upper end of the housing. Pressure is applied axially, to form a substantially air-tight seal with the gaskets 40. This deforms the gaskets, more or less, depending upon their composition, and the pressure required will depend upon the composition of the gaskets, etc. and may range from several hundred pounds to several thousand pounds. For rubber gaskets of 40 Durometer, one-half inch in diameter, a pressure in the neighborhood of 1500 pounds has been found satisfactory. While the caps are held under this pressure the side wall of each cap is pressed into its groove at the end of the housing with the rubber band 43 under it.

In the next step of assembling the lightning arrester the surfaces of the end fittings and the housing which are to be covered by cement are prepared by applying a light coat of asphalt 53, 54. The outer surface of the housing is sanded at 56, adjacent the edge of the sealing cap. Asphalt 57 is coated over the sand. Cement barrier rings 51 are put in the groove 52 in the opening in the end fitting. A spring plate 8 is placed in each of the fittings. The end fittings are then placed over the ends of the housing, enclosing the sealing caps. Then pressure is applied to the end fittings, which may be a pressure of the same order as that previously described. This pressure is transmitted from the end fittings through spring plates 8 to the outer surface of the grooves 41. This pressure is sufficient to deform each spring plate and in the finished assembly it is deformed so that even though subsequently there be some relaxation of the rubber gasket, the spring plate will nevertheless maintain sufficient pressure on the gasket to retain the seal.

While this pressure is maintained on the end fittings, cement is filled into the space provided between the asphalt-coated wall of the end casting and the housing. The resilient cement barrier 51 at each end of the housing closes the space between the end fitting and that portion of the metal sealing cap which is over the projection 44 of the housing, and regardless of the pressure applied to the end fittings serves as a barrier which excludes the cement from the space between the end of the sealing cap and the end fitting. If wet cement were allowed to flow down into this space it would be apt to corrode the spring plate and interfere with its operation.

The spring plate 8 maintains electrical contact between the end fitting and the sealing cap to facilitate lightning discharge from line terminal 60 to ground terminal 61. This contact is maintained even though there be axial movement of the resilient cap 4 due to deterioration of the gasket 40.

The lightning arrester may be mounted on a transformer or in any other usual manner and be connected through any suitable ground. The end assemblies maintain a seal over each end of the housing and prevent or retard leakage of the inert gas and its replacement by the atmosphere.

The invention does not relate to the elements or arrangement of the elements within the housing. The structure and assembly of the elements in the end closures to which the invention relates may be modified without departing from the scope of the appended claims. For instance, a metal cap 4, in covering the projection 44 at its end of the housing, may contact the inner wall of the end fitting and form a seal which prevents liquid draining from the cement seal, while fresh, into the chamber which contains the spring 8. The rubber barrier ring 51 may then be omitted.

What we claim is:

1. In a lightning arrester formed of two end fittings joined by a porcelain housing through which is a generally cylindrical opening in which are located lightning-arresting elements, with sand affixed to the outer surface of the housing and a wall of each of said fittings encircling the end of the housing and spaced from its outer surface, the improvement which includes a resilient metal sealing cap over each end of the housing with its side wall bent inwardly over a projecting portion of the housing and separated from the housing by a resilient gasket held tightly between the cap and the housing, an annular ring of larger diameter than said opening impressed in each cap and in the ring a rubber gasket which is compressed against its end of the housing, the portion of each sealing cap which covers the open end of the housing being bent toward the opening, each sealing cap being bent away from the opening inside of said annular bent portion but with its central portion bent toward the opening in the housing, a perforation in said central portion of at least one of the sealing caps which opening is sealed over with metal on the outer surface of the cap, a circular depression in the central portion of the inner surface of each end fitting which is larger in diameter than the opening at each end of the housing, an annular spring plate fulcrumed near its outer edge on the edge of the depression which inwardly of the fulcrum is in pressure contact with the outer surface of the aforesaid annular ring in the cap which holds the rubber gasket, the inner surface of each end fitting approaching the portion of the sealing cap which covers said projection at its end of the housing, a rubber barrier ring sealing off this space between the fitting and the cap, said sand on the outer surface of the housing being adjacent the edge of the sealing cap, asphalt coating on (1) the sand, (2) the exposed surface of each cap near the edge thereof, and (3) the inner surface of the wall of each end fitting between the edge thereof and its contact with said barrier ring, the space between the wall of the end fitting and the outer surface of the housing down to said barrier ring being filled with cement, the space within the housing and adjacent the open ends of the housing and bounded by the sealing caps and the rubber gaskets being substantially dry and oxygen free.

2. In a lightning arrester, a generally cylindrical housing the outside diameter of one end of which is greater than the outside diameter of the housing a short distance from that end, an annular gasket around the opening at said end of the housing, a thin metal sealing cap over that end of the housing and conforming to the outer wall of the housing said short distance from its end whereby the cap is held on the housing, an annular groove in the inner surface of the cap which fits over the gasket but is not as deep as the gasket is thick, an end fitting fastened to the housing over said end thereof, said fitting having a depression in its under surface opposite said opening, and a frusto-conical spring tapering outwardly which fits into the depression and is centered therein and presses against the outer surface of the groove whereby the gasket is pressed against the end of the housing.

3. In a lightning arrester, a generally cylindrical housing the outside diameter of one end of which is greater than the outside diameter of the housing a short distance from that end, an annular gasket around the opening at said end of the housing, a thin metal sealing cap over that end of the housing and conforming to the outer wall of the housing said short distance from its end whereby the cap is held on the housing, an annular groove in the inner surface of the cap which fits over the gasket but is not as deep as the gasket is thick, an end fitting fastened to the housing over said end thereof, said fitting having a depression in its under surface opposite said opening, a frusto-conical spring tapering outwardly which is centered by means on the inner surface of the fitting and presses against the outer surface of the groove whereby the gasket is pressed against the end of the housing, cement which bonds the end fitting to the outside of the housing at a location away from the end of the housing and a resilient barrier which excludes the cement from the portion of the end fitting which covers the end of the housing and is located between the sealing cap and the end fitting beyond the outer edge of the spring.

JOHN M. SHEADEL.
JOHN J. TAYLOR.

References Cited in the file of this patent
UNITED STATES PATENTS

| Number | Name | Date |
|---|---|---|
| 1,182,917 | Lotz | May 16, 1916 |
| 1,717,589 | Smith | June 18, 1929 |
| 2,003,954 | Pittman | June 4, 1935 |
| 2,029,562 | Earle | Feb. 4, 1936 |
| 2,163,697 | Mittelstadt | June 27, 1939 |
| 2,179,297 | Johnson | Nov. 7, 1939 |
| 2,192,773 | McFarlin | Mar. 5, 1940 |
| 2,253,264 | Burleson | Aug. 19, 1941 |
| 2,284,926 | Smith | June 2, 1942 |
| 2,305,398 | Watson | Dec. 15, 1942 |
| 2,334,948 | Newton | Nov. 23, 1943 |
| 2,379,053 | Weingart | June 26, 1945 |
| 2,380,797 | Severin | July 31, 1945 |
| 2,422,978 | Olsen | June 24, 1947 |